United States Patent [19]
Guthrie

[11] Patent Number: 6,048,635
[45] Date of Patent: Apr. 11, 2000

[54] POLYMERIC HEADER FOR FUEL CELL PRESSURE PLATE ASSEMBLIES

[75] Inventor: Robin Jay Guthrie, East Hartford, Conn.

[73] Assignee: International Fuel Cells Corporation, South Windsor, Conn.

[21] Appl. No.: 09/139,314

[22] Filed: Aug. 25, 1998

[51] Int. Cl.⁷ .............................. H01M 2/00; H01M 8/10
[52] U.S. Cl. ................................ 429/34; 429/32; 429/37; 429/38; 429/39
[58] Field of Search ................................. 429/32, 34, 37, 429/38, 39

[56] References Cited

U.S. PATENT DOCUMENTS 5,916,505  6/1999  Cisar et al. ............................... 264/85

*Primary Examiner*—Maria Nuzzolillo
*Assistant Examiner*—Angela J. Martin
*Attorney, Agent, or Firm*—McCormick, Paulding & Huber LLP

[57] ABSTRACT

The end plate assemblies in a fuel cell stack are conductive and made from metal that is susceptible of corroding in the hostile fuel cell environment. Coolant fluid circulates through these plates. Reactants must also be fed through the end plate assemblies plate. The reactant and coolant fluids are delivered through manifolds that communicate with each cell. Savings in weight and improvements in corrosion resistance are achieved by fabricating headers for these pressure plates of polymeric material. Each header has fluid inlet or outlet ports and internal passageways that communicate with passageways in the cell assemblies located between the metal pressure plates.

7 Claims, 3 Drawing Sheets

POLYMERIC HEADER FOR FUEL CELL PRESSURE PLATE ASSEMBLIES

Fuel cell power plants are known in the prior art. In such fuel cell power plants, the fuel cell power generating source is called the fuel cell stack assembly. This cell stack assembly (CSA) can typically be described in part according to the fluid supply methods employed as either internally or externally manifolded. In an externally manifolded CSA, the fluids are supplied from manifolds that are external to the plan form of the operating fuel cells while in the internally manifolded CSA the opposite is true. In both cases, the CSA is held together by using a pressure plate and end plate assembly of some type. A typical example of an external manifold and the related end plate assembly is described in IFC Patent No. 4,728,585. A typical example of an internal manifold and related end plate assembly is described in IFC Patent No. 4,743,518. With the internal manifolding, the pressure plate and end plate assemblies and the manifolding for supplying the CSA fluids are incorporated into the same component. This makes material selection a more difficult task because each functional requirement may have different material requirements.

The present invention relates to a fuel cell stack assembly in which the fuel cell pressure plates are fabricated from a composite of at least two different materials, one of which materials is of a lighter weight and non-corrosive polymeric material, as compared to the metallic plate material required in the typical fuel cell pressure plate construction.

One type of fuel cell power plant where material selection is critical is a PEM cell. U.S. Pat. No. 5,503,944 shows a typical PEM fuel cell unit which comprises a proton exchange membrane provided between an anode plate assembly and a cathode plate assembly. The anode is provided with an anode flow field plate for supplying a fluid fuel or reactant gas, such as hydrogen, to the anode. The cathode plate assembly defines a flow field for a gas, such as ambient air, or oxygen, to provide such gas to the cathode. Finally, each cell further includes means for circulating a coolant fluid such as water through the cell. Some water maybe added to the coolant stream which is water formed as a byproduct of the normal operation of the cell. Such water is sometimes referred to as "product water".

Both the negative end plate assembly and the positive end plate assembly of prior art fuel cells are generally fabricated from conductive materials as shown, for example, in Ballard U.S. Pat. No. 5,230,966.

The object of the present invention is to provide increased use of polymeric materials that provide corrosion resistance for the coolant water and other fluids and gases commonly used in fuel cells.

SUMMARY OF THE INVENTION

In accordance with the present invention, a fuel cell stack is provided having individual cells that include an electrolytic membrane between electrically conductive anode, and cathode plate assemblies. These anode and cathode plate assemblies include associated catalysts as suggested for example in prior art U.S. Pat. No. 5,503,944, which Patent is incorporated by reference.

The anode plate assemblies define fuel passageways, and the cathode plate assemblies define oxidant passageways as described in the above-mentioned '944 Patent. Coolant fluid passageways are also defined in both the anode plate assemblies and cathode plate assemblies, as described in said '944 Patent. The anode plate, the membrane electrode assembly and the cathode plate described in Patent '944 contain integral edges that define parts for distributing the reactants and coolant as shown in the above-mentioned '966 Patent. The combination of the anode plate, membrane electrode assembly and the cathode plate is referred to as a cell assembly.

The positive end plate assembly is provided with a header at end portion thereof, which header defines fuel inlet and coolant outlet ports. Each header further includes internal coolant and fuel inlet passageways that communicate with passageways provided in the cell assembly. The headers are preferably fabricated from a non-conductive polymeric material that may include a filler such as glass fiber for additional strength and a lower coefficient of thermal expansion. This construction provides for greater corrosion resistance and reduces the weight of the anode plate assemblies. The coolant, which is high purity water, comes in contact with the electrolytic proton exchange membrane in a cell such as shown in the '944 Patent. Any metal cations that are produced as a result of corrosion may be absorbed by the proton exchange membrane. The absorption of these metal cations, displaces the protons, thus reducing the conductivity of the proton exchange membrane and reducing the efficiency and life of the fuel cell. Similar advantages can be realized in each negative end plate assembly by providing a header that is associated with the coolant inlet port and fuel exit ports of the cell assembly. The coolant inlet headers and fuel exit headers are provided on opposite end portions of the fuel cells from those end portions associated with the positive end plate assembly headers, to facilitate manifolding of these headers.

The principal object of the present invention is to provide an improved fuel cell stack structure that includes end plate assemblies which are more effectively connected to the fuel inlet and exit manifolds and the fluid coolant inlet and outlet manifolds. The resulting structure permits greater use of non-conductive polymeric material as compared to the conductive metal material commonly used in fabricating prior art end plate assemblies.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

BEST MODE FOR CARRYING OUT THE INVENTION

Figure 2A:
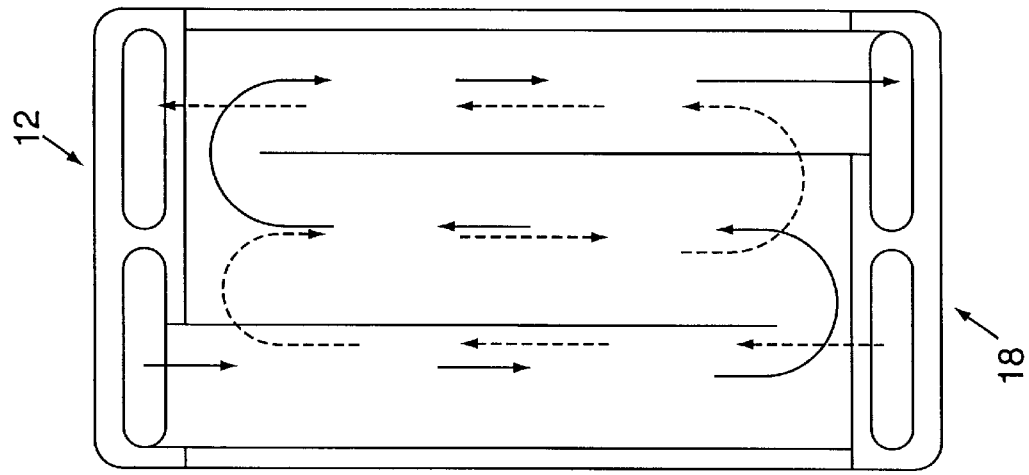
FIG. 2A is a planform view of one of the cells.
Figure 2:
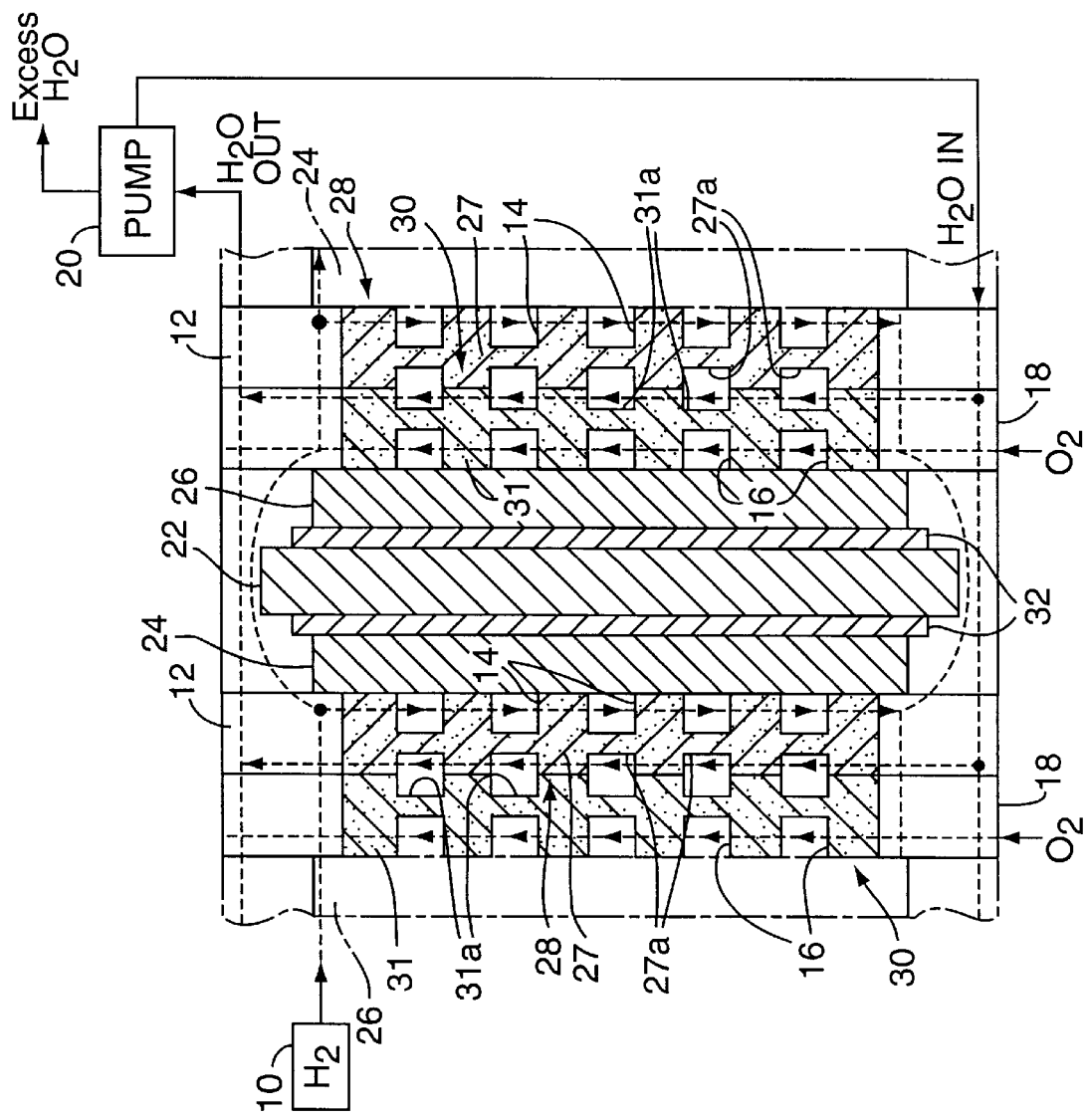
FIG. 2 is a schematic elevational view of one of the cells in an assembly of a plurality of such cells as suggested by the phantom lines.

Referring now to the drawings in greater detail, FIG. 2 shows, in schematic fashion, the components of a fuel cell such as would be provided in a fuel cell stack or power plant in accordance with the present invention. A supply of reactant gas in the form of hydrogen or a hydrogen rich gas is provided as represented by the source $H_2$.

The hydrogen reactant gas flows from this source 10 to a fuel inlet port defined by the header 12 in the cell assembly 28 and 30. Internal passageways (to be described) deliver the hydrogen reactant gas to anode flow fields illustrated schematically at 14. The amount and pressure of hydrogen flowing through the anode flow field 14 is controlled by conventional gas regulating devices that in turn may be manually or automatically operated. These anode flow fields 14 in each of the fuel cells are vented from the stack. Cathode flow fields indicated generally at 16 are supplied with ambient air or oxygen from a suitable source (not shown). Coolant water is circulated through the fuel cell units as suggested by the coolant fluid inlet header 18 located opposite the header 12 associated with the hydrogen fuel inlet described previously. Circulation of this coolant water is achieved by a conventional circulation system as suggested generally in FIG. 2A. Such a system is provided with a suitable pump 20 adapted to circulate water through passageways in the cell assemblies 28 and 30, and through a closed loop, as indicated, that may include a suitable heat exchanger for lowering the temperature of the water exiting the header. Excess water may be drawn off from the system all in accordance with conventional techniques for the operation of fuel cells generally. The reader is referred to U.S. Pat. No. 5,503,944 for a more complete explanation of the flow patterns in a typical fuel cell stack.

Each fuel cell of the fuel cell stack comprises a proton exchange membrane 22 that is provided between the anode 24 and the cathode 26. The anode fine pore plate assembly comprises the anode itself and a conductive porous plate element 27 that provides passageways 27a for the hydrogen. A catalyst layer, which is also conductive, is provided as suggested at 32 between the anode 24 and the membrane 22. U.S. Pat. No. 5,503,944 may be referred to for a more complete explanation of the fuel cell construction. The '944 Patent is also incorporated by reference in this disclosure.

The cathode plate assembly comprises the cathode itself 26 and a porous plate 31 having passageways for the oxidant as shown at 31a. The header 18 forms a portion of this cathode fine pore plate assembly. The cathode 26 is provided between the electrolytic membrane 22 and the porous plate 31 of the cathode fine pore plate assembly as shown. Thus, both porous plates 27 and 31 define passageways for both the fuel and the ambient air or oxygen that is drawn into the system all as described in the '944 Patent.

As so constructed and arranged, the fuel cell of FIG. 2 operates in a conventional fashion, and serves to convert the hydrogen fuel source and oxygen into electricity using components of conventional geometry except for the structure of the headers 12 and 18 to be described in greater detail hereinafter. The cooling water assures operation of the fuel cell stack at reasonable temperatures, each of the cells in the stack being provided with water from inlet and outlet manifolds associated with the headers 12 and 18 as shown schematically in FIGS. 2 and 2A.

Figure 1A:
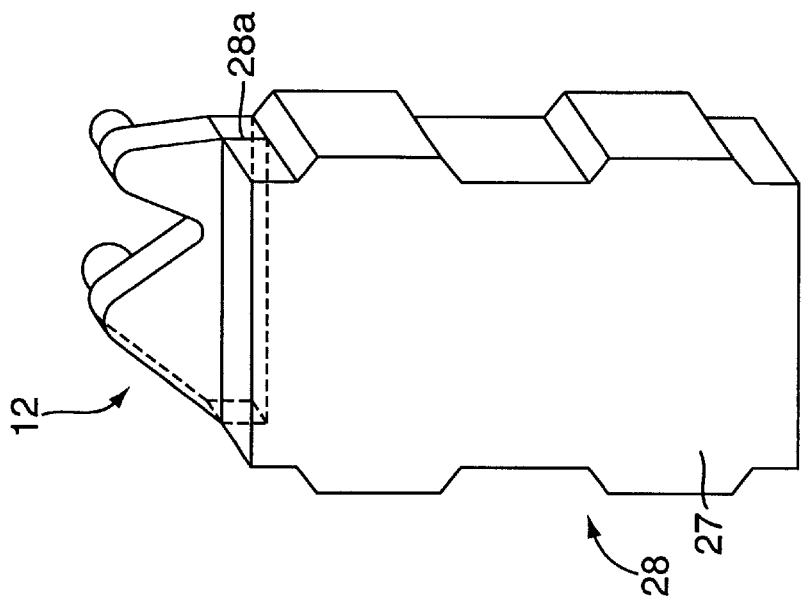
FIG. 1A shows the positive end plate assembly from the opposite side.
Figure 1:
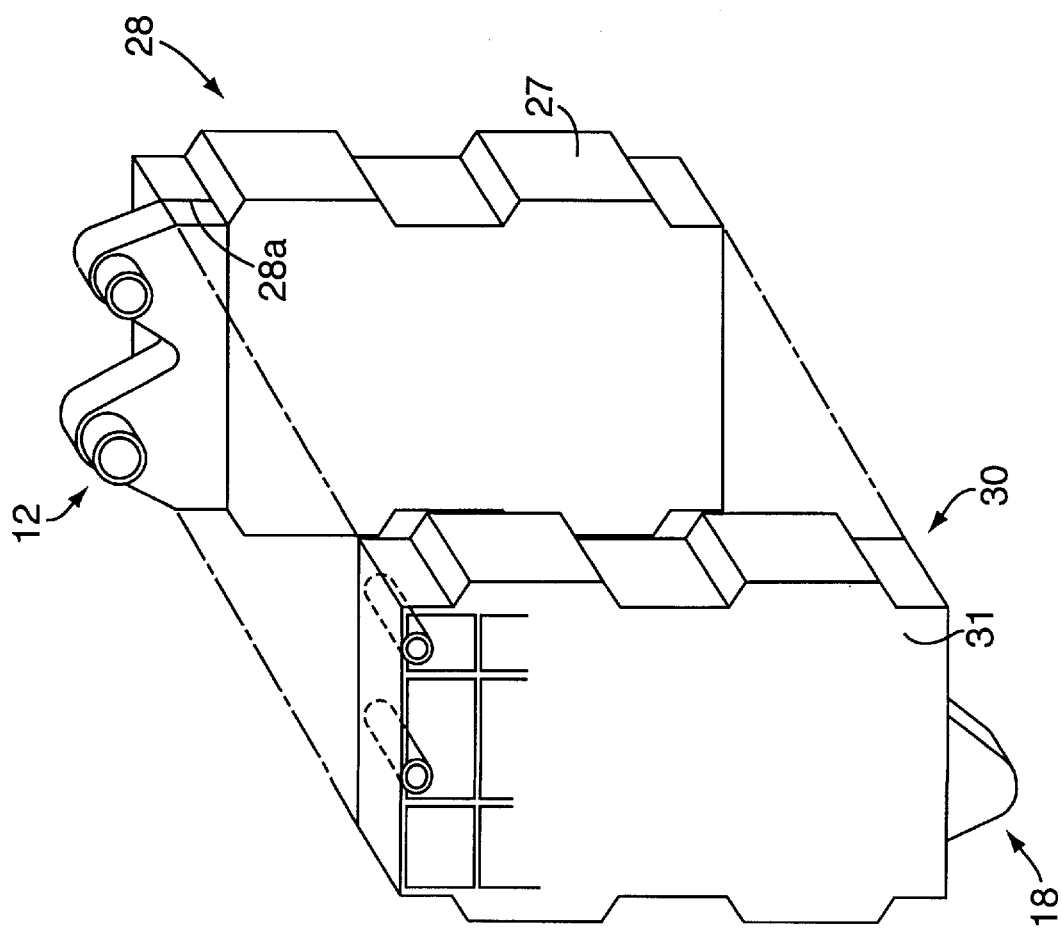
FIG. 1 is an exploded perspective view of a negative end plate assembly with header according to the present invention, and also shows a positive end plate assembly with associated header.

Turning next to a more detailed description of FIG. 1, the positive end plate assembly 28 includes a header 12 mounted in a notch 28a provided for this purpose in the metal conductive positive end plate assembly or elements 27. The header 12 is fabricated from a different material than that from which these plate elements are made, preferably being fabricated from a polymeric material such as NORYL, a proprietary product of General Electric Company. This polymeric material preferably has a filler added to the extent of at least 30%. A glass fiber filler is preferred. This polymeric material provides some of the same strength and thermal expansion characteristics of the electrically conductive metal material from which the end plates are fabricated, but affords superior corrosion resistance and lighter weight. Typically, the metal used comprises an aluminum alloy that is plated with nickel to prevent corrosion.

Figure 3:
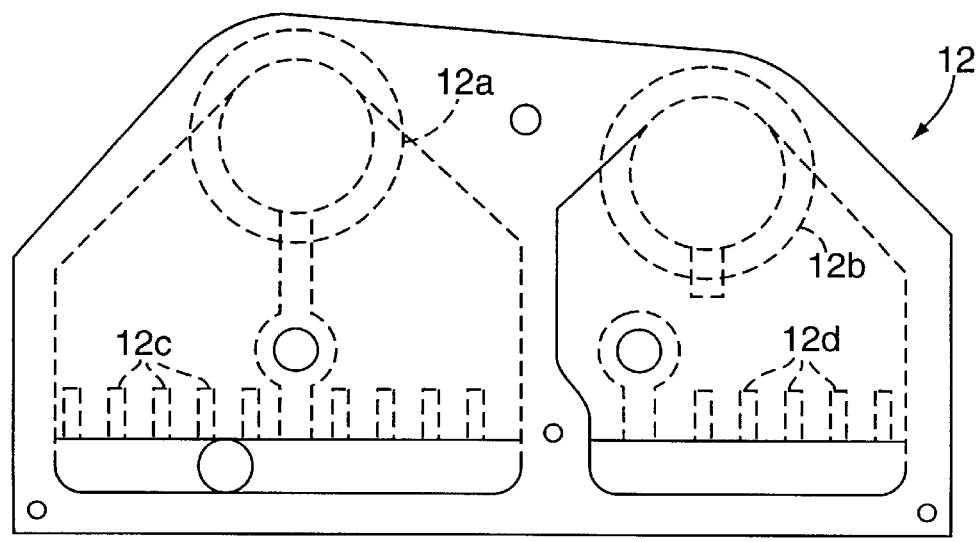
FIG. 3 is a detailed view of the header in a positive end plate assembly.
Figure 4:
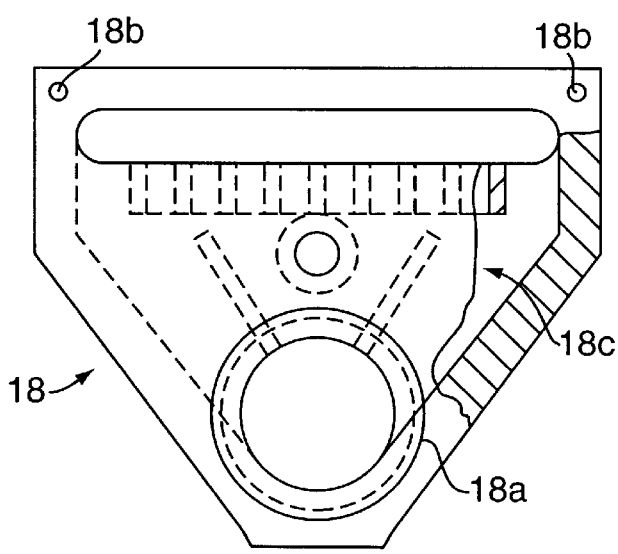
FIG. 4 is a detailed view of the header in a negative end plate assembly.

FIG. 3 shows the header 12 in somewhat greater detail as including both a fluid coolant outlet port, in the form of boss 12a, and a hydrogen fuel inlet port as indicated at 12b. Internal fuel and coolant fluid passageways are formed in this polymeric header 12 so that each of these ports, 12a and 12b, in turn communicates through said internal passages 12c and 12d respectively, with the hydrogen flow passageways 31a of the cell assembly, and with the internal passageways defined in the cell assembly for the coolant. A water transport plate assembly provides for the transfer of coolant fluid from the header 18 associated with the water transport plate assembly through the passageways defined in part by an anode fine pore plate assembly and in part by a cathode fine pore plate assembly. The header 18, best shown in FIG. 4, can be seen to have internal passageways 18c which serve to carry the cooling fluid from the cooling fluid inlet port 18a in the header 18 through these passageways and ultimately through the porous plates of both the anode plate assembly and the cathode plate assembly and out of the header 18 through its associated coolant fluid outlet port 18b.

Figure 5:
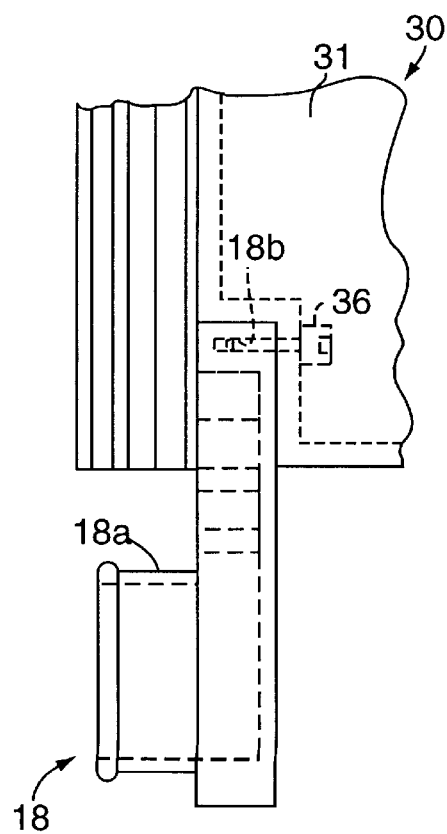
FIG. 5 is a side view of the FIG. 4 header shown secured to the negative end plate assembly.

FIG. 5 shows the header 18 secured to the negative end plate 31 by fasteners 36. It should be noted that both headers 18 and 12 are adapted to be releasably secured to their associated plate assemblies by conventional fasteners received in openings 18b, and as suggested in FIG. 5 by the fastener 36. Similar fasteners are provided for securing the header 12 in the positive end plate assembly 28.

Although, the invention has been shown and described with respect to a preferred embodiment thereof, it will be understood by those skilled in the art that other various changes, omissions and additions thereto may be made without departing from the spirit and scope of the present invention.

In light of the above, it is therefore understood that within the scope of the appended claims, the invention may be practiced otherwise than as specifically described.

What is claimed is:

1. A plurality of fuel cells arranged in a stack, said cells including proton exchange membranes and conductive end plate assemblies:

reactant passageways defined in said end plate assemblies;

coolant fluid passageways defined in said end plate assemblies; and reactant inlets and outlets, and coolant inlets and outlets, all defined by headers secured to said end plate assemblies, said headers being made from a non-conductive material and defining internal ports communicating with said reactant and coolant fluid passageways in said conductive end plate assemblies.

2. The fuel cell stack of claim 1, wherein at least one of said headers has at least one coolant outlet port for communication with a supply of fluid coolant.

3. The fuel cell stack of claim 2, wherein at least one of said headers has at least one reactant inlet port for communication with a reactant source.

4. The fuel cell stack of claim 1, wherein said end plate assemblies are fabricated from a light weight conductive metal and wherein said headers are fabricated from a polymeric material with a fiber reinforcing filler added to provide greater strength and a lower coefficient of thermal expansion.

5. The fuel cell stack of claim 1, wherein removable fasteners are provided to secure said headers to said anode plate assemblies.

6. The fuel cell stack of claim 1, wherein said end plate assemblies are generally rectangular and have end portions that are notched to receive said headers, said cathode plate assemblies having end portions that are generally aligned with one another in the stack, said headers projecting beyond said aligned end portions to facilitate intercommunications between said headers.

7. The fuel cell stack of claim 6, wherein said end plate assemblies are fabricated from a light weight conductive metal and wherein said headers are fabricated from a polymeric material with a fiber reinforcing filler added.

* * * * *

UNITED STATES PATENT AND TRADEMARK OFFICE
CERTIFICATE OF CORRECTION

PATENT NO. : 6,048,635
DATED : April 11, 2000
INVENTOR(S) : Robin Jay Guthrie

It is certified that error appears in the above-identified patent and that said Letters Patent is hereby corrected as shown below:

Column 4,
Line 29, please delete "18" and insert -- 12 (see Fig. 3) --.
Line 30, please delete "18b" and insert -- 12a (see Fig. 3) --.

Signed and Sealed this

Fourteenth Day of January, 2003

JAMES E. ROGAN
*Director of the United States Patent and Trademark Office*